(12) United States Patent
Huynh et al.

(10) Patent No.: US 9,183,543 B2
(45) Date of Patent: Nov. 10, 2015

(54) TRACKING DIGITAL CONTENT OBJECTS

(75) Inventors: Anh Huynh, Beaverton, OR (US);
Hemingway Huynh, Beaverton, OR (US); Isabella Wong, Bellevue, WA (US); Jeffrey Michael Farnsworth, Beaverton, OR (US)

(73) Assignee: Prolifiq Software Inc., Beaverton, OR (US)

( * ) Notice: Subject to any disclaimer, the term of this patent is extended or adjusted under 35 U.S.C. 154(b) by 516 days.

(21) Appl. No.: 13/032,461

(22) Filed: Feb. 22, 2011

(65) Prior Publication Data

US 2011/0208821 A1    Aug. 25, 2011

Related U.S. Application Data

(60) Provisional application No. 61/306,288, filed on Feb. 19, 2010.

(51) Int. Cl.
*G06F 15/16* (2006.01)
*G06Q 10/10* (2012.01)

(52) U.S. Cl.
CPC .................. *G06Q 10/107* (2013.01)

(58) Field of Classification Search
CPC .......... G06F 17/3089; G06F 17/30905; G06Q 30/02; G06Q 30/0201; G06Q 30/0242; G06Q 30/0277; H04L 12/5885; H04L 43/08; H04L 63/105; H04L 67/02; H04L 67/22
USPC ........................................................ 709/206
See application file for complete search history.

(56) References Cited

U.S. PATENT DOCUMENTS

| 5,907,598 | A | 5/1999 | Mandalia |
| 5,983,022 | A | 11/1999 | Watkins |
| 5,987,504 | A | 11/1999 | Toga |

(Continued)

FOREIGN PATENT DOCUMENTS

| WO | WO0030009 A2 | 5/2000 |
| WO | WO 0065762 A2 | 11/2000 |
| WO | WO 01/93509 A1 | 12/2001 |

OTHER PUBLICATIONS

Backweb Technologies, Inc.; "BackWeb and ElasticEdge Enable Easy Delivery of Rich Media Content with BackWeb's Push Technology," San Jose, California, http://216.239.51.100/sea... relelasticedge.html+email+html+push+any+type+of+media+ &hl=3, 2 pg., Jun. 29, 2000.

(Continued)

*Primary Examiner* — Christopher Biagini
(74) *Attorney, Agent, or Firm* — Schwabe Williamson & Wyatt

(57) ABSTRACT

Embodiments include methods, apparatus, and systems associated with tracking display of digital content objects, and in particular digital content objects in delivered electronic messages. Digital content objects may be identified and associated with a digital content item. Digital content objects may be presented together in digital container. Different presentation layers containing one or more digital containers may be defined and transmitted in electronic messages. A digital content object tracking system may identify delivered and displayed digital content objects, and associate the display with digital content objects contained therein. The digital content object tracking system may compare displays or activations of one or more digital content objects with reference to co-displayed digital content objects. Other embodiments may be described and claimed.

25 Claims, 9 Drawing Sheets

(56) References Cited

U.S. PATENT DOCUMENTS

| | | | |
|---|---|---|---|
| 6,014,689 A | 1/2000 | Budge | |
| 6,023,714 A | 2/2000 | Hill | |
| 6,035,339 A | 3/2000 | Agraharam | |
| 6,092,114 A | 7/2000 | Shaffer | |
| 6,119,165 A | 9/2000 | Li | |
| 6,167,435 A | 12/2000 | Druckenmiller et al. | |
| 6,167,441 A | 12/2000 | Himmel | |
| 6,182,094 B1 | 1/2001 | Humpleman | |
| 6,212,564 B1 | 4/2001 | Harter | |
| 6,243,392 B1 | 6/2001 | Uemura | |
| 6,247,050 B1 | 6/2001 | Tso | |
| 6,253,207 B1 | 6/2001 | Malek | |
| 6,279,030 B1 | 8/2001 | Britton | |
| 6,279,041 B1 | 8/2001 | Baber | |
| 6,292,554 B1 | 9/2001 | Oden | |
| 6,317,761 B1 | 11/2001 | Landsman | |
| 6,317,782 B1* | 11/2001 | Himmel et al. | 709/218 |
| 6,317,795 B1 | 11/2001 | Malkin | |
| 6,345,279 B1 | 2/2002 | Li | |
| 6,345,298 B1 | 2/2002 | Moriya | |
| 6,356,921 B1 | 3/2002 | Kumar | |
| 6,360,252 B1 | 3/2002 | Rudy | |
| 6,363,524 B1 | 3/2002 | Loy | |
| 6,393,605 B1 | 5/2002 | Loomans | |
| 6,470,378 B1 | 10/2002 | Tracton | |
| 6,480,537 B1 | 11/2002 | Agrawal | |
| 6,496,980 B1 | 12/2002 | Tillman | |
| 6,563,912 B1 | 5/2003 | Dorfman | |
| 6,594,699 B1 | 7/2003 | Sahai | |
| 6,625,460 B1 | 9/2003 | Patil | |
| 6,643,684 B1 | 11/2003 | Malkin | |
| 6,704,024 B2 | 3/2004 | Robotham | |
| 6,704,396 B2 | 3/2004 | Parolkar | |
| 6,738,803 B1 | 5/2004 | Dodrill | |
| 6,742,043 B1 | 5/2004 | Moussa | |
| 6,760,916 B2 | 7/2004 | Holtz | |
| 6,763,377 B1 | 7/2004 | Belknap | |
| 6,789,108 B1 | 9/2004 | McMillan | |
| 6,792,575 B1 | 9/2004 | Samaniego | |
| 6,795,863 B1 | 9/2004 | Doty | |
| 6,829,633 B2 | 12/2004 | Gelfer | |
| 6,832,241 B2 | 12/2004 | Tracton | |
| 6,904,450 B1 | 6/2005 | King | |
| 6,906,818 B1 | 6/2005 | Makishima | |
| 6,938,077 B2 | 8/2005 | Sanders | |
| 6,961,754 B2 | 11/2005 | Christopoulos | |
| 6,970,602 B1 | 11/2005 | Smith | |
| 6,976,082 B1 | 12/2005 | Ostermann | |
| 6,978,418 B1 | 12/2005 | Bain | |
| 6,992,983 B1 | 1/2006 | Chatterjee | |
| 6,996,618 B2 | 2/2006 | Apostolopoulos | |
| 7,003,794 B2 | 2/2006 | Arye | |
| 7,024,485 B2 | 4/2006 | Dunning | |
| 7,051,084 B1 | 5/2006 | Hayton | |
| 7,061,928 B2 | 6/2006 | Giroti | |
| 7,065,555 B2 | 6/2006 | Foulger et al. | |
| 7,149,964 B1 | 12/2006 | Cottrille et al. | |
| 7,228,343 B2 | 6/2007 | Sanders | |
| 7,251,678 B2 | 7/2007 | Mori | |
| 7,523,167 B2 | 4/2009 | Thomas et al. | |
| 7,567,671 B2 | 7/2009 | Gupte | |
| 7,567,916 B1* | 7/2009 | Koeppel et al. | 705/7.29 |
| 7,584,251 B2 | 9/2009 | Brown et al. | |
| 7,707,317 B2 | 4/2010 | Huynh | |
| 7,755,786 B2 | 7/2010 | Foehr | |
| 7,770,200 B2 | 8/2010 | Brooks | |
| 7,802,286 B2 | 9/2010 | Brooks | |
| 7,941,525 B1* | 5/2011 | Yavilevich | 709/224 |
| 7,966,374 B2 | 6/2011 | Huynh | |
| 8,478,824 B2 | 7/2013 | Peled | |
| 2001/0016869 A1 | 8/2001 | Baumeister | |
| 2001/0034769 A1 | 10/2001 | Rast | |
| 2001/0043516 A1 | 11/2001 | Gelfer | |
| 2001/0047517 A1 | 11/2001 | Christopoulos | |
| 2002/0016818 A1 | 2/2002 | Kirani | |
| 2002/0032754 A1 | 3/2002 | Logston | |
| 2002/0065925 A1 | 5/2002 | Kenyon | |
| 2002/0073217 A1 | 6/2002 | Ma | |
| 2003/0028647 A1 | 2/2003 | Grosu | |
| 2003/0055925 A1 | 3/2003 | McAlinden | |
| 2003/0093565 A1 | 5/2003 | Berger | |
| 2003/0097485 A1 | 5/2003 | Horvitz | |
| 2003/0110234 A1 | 6/2003 | Egli | |
| 2003/0110236 A1 | 6/2003 | Yang | |
| 2003/0154253 A1 | 8/2003 | Smith | |
| 2003/0161448 A1 | 8/2003 | Parolkar | |
| 2003/0200263 A1 | 10/2003 | Golberg | |
| 2003/0236892 A1 | 12/2003 | Coulombe | |
| 2003/0236917 A1 | 12/2003 | Gibbs | |
| 2004/0019648 A1 | 1/2004 | Huynh | |
| 2004/0083291 A1 | 4/2004 | Pessi | |
| 2004/0093429 A1 | 5/2004 | Burton et al. | |
| 2004/0133640 A1 | 7/2004 | Yeager | |
| 2004/0225753 A1 | 11/2004 | Marriott | |
| 2005/0005022 A1 | 1/2005 | Taylor | |
| 2005/0060381 A1 | 3/2005 | Huynh | |
| 2005/0076089 A1 | 4/2005 | Fonseca | |
| 2005/0165913 A1 | 7/2005 | Coulombe | |
| 2005/0262206 A1 | 11/2005 | Weir | |
| 2006/0020666 A1 | 1/2006 | Lai | |
| 2006/0168064 A1 | 7/2006 | Huynh | |
| 2007/0083810 A1 | 4/2007 | Scott | |
| 2007/0283048 A1 | 12/2007 | Theimer | |
| 2008/0046562 A1* | 2/2008 | Butler | 709/224 |
| 2008/0098420 A1* | 4/2008 | Khivesara et al. | 725/32 |
| 2008/0114830 A1 | 5/2008 | Welingkar | |
| 2008/0209001 A1 | 8/2008 | Boyle et al. | |
| 2010/0235457 A1 | 9/2010 | Huynh | |

OTHER PUBLICATIONS

Backweb Technologies, Inc.; "BackWeb Launches Universal Push Initiative," San Jose, California, 4 pg., http://216.239.51.100/searc.../relunivpush.html+email+html+push+any+type+of+media+&hl=3, Jul. 24, 2000.
Bluestreak; "Rich Media," http://www.bluestreak.com, 6 pg. [accessed Jun. 13, 2002].
Boldfish, Inc.; "An Overview of Rich Media," Santa Clara, California, 4 pg., 2001.
Cisco Systems, Inc.; "The Cisco Content Delivery Network Solution for the Enterprise," San Jose, California, 18 pg., 2000.
Inktomi Corporation; "Inktomi, Portal, Redback and Sun to Launch First Integrated Solution for Broadband Services Delivery," Foster City, California, Sep. 19, 2000.
Multiforce; Cforce, Salesforce.com, internet publication, http://www.salesforce.com (accessed Dec. 3, 2005).
Push Publishing Technologies; "Push Publishing Technologies of Yesterday and Today," http://216.239.51.100/search?q=cac.../t4a.html+email+html+push+any+type+of+media+&hl=3, 6 pg., [accessed Jun. 14, 2002].
Stardust.Com; "CDN 2001 White Paper—The Ins and Outs of Content Delivery Networks," Stardust.com, Inc., Los Gatos, California, 19 pg., Dec. 20, 2000.
Jumpstart.Responsys; internet website; http://jumpstart.responsy.com/info; Jun. 19, 2000.
Mightymail; "Email 2.0;" internet website; http://www.mightymail.colm/demo.html; Dec. 7, 2000.
Post Communications; "Technology;" internet website; http://emailmarketing.com/solutions/technology/index.html; Dec. 15, 2000.
Seibel eBUSINESS; "Siebel Email Marketing Stand-Alone Administration Guide;" Version 7.5.3, Revision A, Mar. 2004.
Seibel eBUSINESS; "Siebel Email Marketing Stand-Alone Installation Guide;" Version 7.5.3, Revision A, Mar. 2004.
Timedance; TimeDance Acquires Invitemetoo; Leading Online Invitation Sites Join Forces; Business Wire; internet article; www.thefreelibrary.com/_/print/PrintArticle.aspx?id-59610369; Feb. 22, 2000.
Unity Mail; "Unity Mail 4.0—technically speaking;" internet website; http://www.messagemedia.com/solutions/unitymail/um4_0_specs.shtml; Apr. 13, 2001.

(56) References Cited

OTHER PUBLICATIONS

Unity Mail; "Why Unity Mail?;" internet website http://www.messagemedia.com/solutions/unitymail/um4_0_whyUM.shtml; Apr. 13, 2001.

123Greetings; Greeting Cards by 123Greetings. Greeting cards, postcards, love; Internet website, https://web.archive.org/web/1990125072208/http://123greetings.com/; Jan. 25, 1999.

American Greetings; internet website; http://web.archive.org/web/200002290830481http://www.americangreetings.com/customer/og.pd; Feb. 29, 2000.

Blue Mountain Arts; internet website; http://www.2bluemountain.com/home; Sep. 11, 1999.

Britemoon; internet article; http://www.britemoon.com/products/index3.html; Nov. 16, 2001.

Castle Mountains; internet website; http://www.castlemountains.net; Nov. 18, 2000.

Coldspark; internet website; http://lwww.coldspark.com/clientslmarketing_exec.asp; Dec. 1, 2001.

Digital Impact; internet website; http://www.digitalimpact.com/marketers_2_2.html; Nov. 28, 1999.

Dynamics Direct; How We Boost Response; internet website; http://www3.dynamicsdirect.com/print/boost.html; Mar. 7, 2001.

eGREETINGS; internet website; https://wegb.archive.org/web/19970113184017/http://egreetings.com/; Jan. 13, 1997.

European Search Report in European Patent Application No. 14150955.4 dated Apr. 16, 2014.

eVITE.Com; internet website; http://www.evite.com/compose?linkTagger=textButton; Jun. 21, 2000.

Exact Target; internet website and user guide; https://web.archive.org/web/20041105053114/http:/website. exacttargetcom/product_agency_asp; Oct. 8, 2000.

Interact; internet website; http:/wayback.archive.org/web/200000302163346/http://www.responsys.com/website/documents/interactdata.pdf; Mar. 3, 2000.

Kana Connect; "Who is Changing the Way E-businesses Communicate with their Customers?" Jul. 22, 2001.

Yesmail; "YesConnect Retention—Manage Simple to Sophisticated Email Programs with Yesmail's Flexible Technology;" https://web.archive.org/web/20030309233241/http://www.postcommunications.com/images/pdf/retention.pdf; Mar. 9, 2003.

U.S. Appl. No. 13/841,982; Non-Final Office Action; May 7, 2015.

Canadian Patent Application No. 2840497; Office Action; Apr. 23, 2015.

\* cited by examiner

US 9,183,543 B2

TRACKING DIGITAL CONTENT OBJECTS

RELATED APPLICATIONS

The present application claims the benefit of U.S. Provisional Patent Application No. 61/306,288, filed Feb. 19, 2010, and entitled "Tracking Digital Content Objects," which is hereby incorporated by reference in its entirety.

TECHNICAL FIELD

Embodiments of the present invention relate generally to the field of electronic messaging, and in particular to tracking digital content objects transmitted in electronic messages.

BACKGROUND

Tracking content within electronic messages is typically done through tracking message requests and/or deliveries. For example, if a webserver provides a webpage to a receiving device, the webserver may track the webpage as being viewed by the recipient. Additional tracking granularity may be provided by tracking requests and/or deliveries that take place by a receiving device automatically requesting delivery of an image file in order to render an image within the electronic message, or that take place by a user of the receiving device clicking on a certain area or link to request additional information. While these existing tracking mechanisms may provide some amount of versatility by embedding images in messages, formatting a block of text as an image file, etc., they do not track views of true binary file segments. In particular, existing techniques often do not provide the ability to track rendered text.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through the use of the accompanying drawings, in which:

DETAILED DESCRIPTION

In the following detailed description, reference is made to the accompanying drawings which form a part hereof, and in which are shown by way of illustration embodiments which may be practiced. It is to be understood that other embodiments may be utilized and structural or logical changes may be made without departing from the scope of the disclosure. Therefore, the following detailed description is not to be taken in a limiting sense, and the scope of embodiments is defined by the appended claims and their equivalents.

The disclosure is drawn, inter alia, to systems, methods, and apparatuses for a digital content object tracking system to track display of digital content objects, and in particular digital content objects in delivered electronic messages. In various embodiments, digital content objects may be identified and associated with a digital content item. In various embodiments, digital content objects may be presented together in a digital container. In various embodiments, different presentation layers containing one or more digital containers may be defined and transmitted in electronic messages. In various embodiments, a digital content object tracking system may identify delivered and displayed digital content objects, and associate the display with digital content objects contained therein. In various embodiments, the digital content object tracking system may compare displays or activations of one or more digital content objects with reference to co-displayed digital content objects, such as to determine whether display of a particular digital content object increases display or activation of digital content objects of interest.

As used herein, electronic messages may be any of a variety of message types including, but not limited to, a text message, a multimedia message, an electronic mail (e-mail), a file (either coupled to one of the earlier described message types or transferred independently), and/or a markup page (e.g., an extensible markup language (XML) file, a hypertext markup language (HTML)), and the like. In various embodiments, electronic messages may combine one or more of these message types into a hybrid message.

Figure 1:
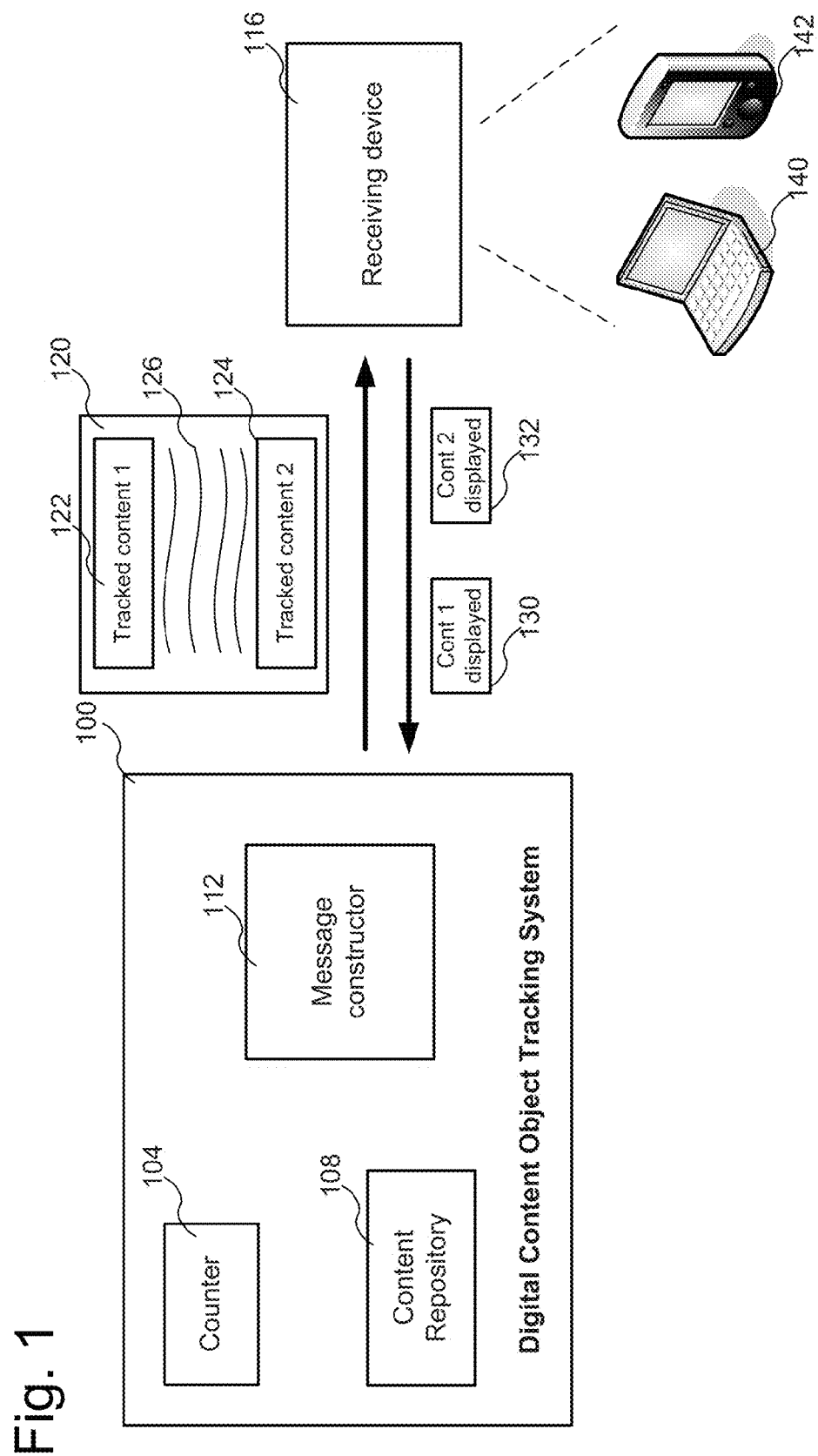
FIG. 1 illustrates a block diagram showing example usage and information flow of a computer-implemented digital content object tracking system in accordance with various embodiments.

FIG. 1 illustrates a block diagram of example usage and information flows in a computer-implemented digital content object tracking system 100 in accordance with various embodiments. While the example illustration shows particular orders of events and flow of information, in various embodiments, various processes may be performed in alternative orders or may be omitted entirely.

The digital content object tracking system 100 may communicate with a receiving device, such as receiving device 116, to send electronic messages, such as electronic message 120. Examples of receiving devices in various embodiments include, but are not limited to, computers, such as laptop computer 140, or mobile devices, such as smartphone 142. In various embodiments, the receiving device 116 may send one or more display notifications, such as notifications 130 and 132, back to the digital content object tracking system 100. The digital content object tracking system 100 may then record data from these notifications to indicate that digital content objects in the electronic messages have been displayed at the receiving device 116.

As illustrated, the digital content object tracking system 100 may comprise various components, such as a counter 104, a content repository 108, and a message constructor 112 as shown. In some embodiments, one or more of the components of the digital content object tracking system 100 may be distributed among one or more computer devices (e.g., an initiating device and an email server, an initiating device and a hosting server, etc.).

In various embodiments, the counter 104 may comprise software or hardware modules for maintaining and modifying individual counting records for various digital content objects and/or items. In various embodiments, the counter 104 may selectively track the digital content objects that are transmitted to the receiving device 116 within the electronic messages In various embodiments, the content repository 108 may maintain information describing one or more digital containers comprising one or digital content objects. The content repository 108 may also maintain information describing one or more digital content objects as associated with one or more digital content items, as will be described herein. In various embodiments, the content repository 108 may maintain actual content; in alternative embodiments, the content repository 108 may solely maintain relationships between digital content objects, and may maintain no content. In various embodiments, the content repository 108 may maintain definitions for one or more containers, as will be described.

In various embodiments, digital content objects may comprise textual information from various categories. For example, in various embodiments, categories could include, but are not limited to, full body text, partial body text, title, abstract, publisher, publishing date, author, etc. In other examples, digital content objects may comprise other content, such as image or video content, or other binary information.

In various embodiments, the message constructor 112 may construct electronic messages having digital content objects that are described in detail in the content repository 108. As illustrated, electronic messages, such as electronic message 120, may contain one or more portions of tracked content. In the illustration of FIG. 1, these portions are illustrated as portions 122 and 124. In addition, the electronic message 120 may contain content for which tracking is not desired. As illustrated herein, such content may be graphically represented by wavy lines, such as content 126.

Figure 2:
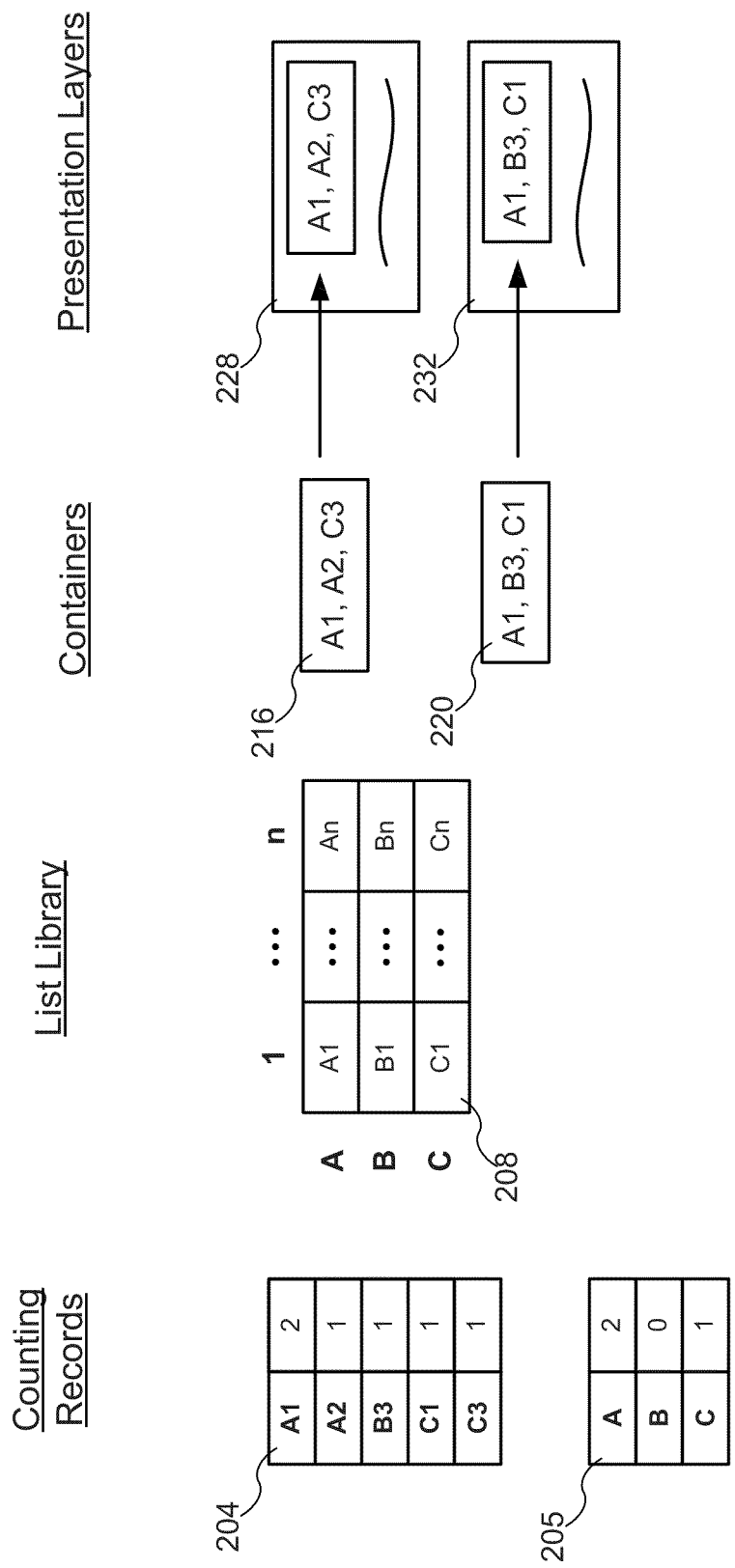
FIG. 2 illustrates a block diagram of information maintained by the digital content object tracking system in accordance with various embodiments.

FIG. 2 illustrates information maintained by the digital content object tracking system 100 in accordance with various embodiments. In various embodiments, the counter 104 may maintain a number of individual counting records, such as records 204 and 205, that each correspond to digital content elements. In some embodiments, digital content elements may comprise digital content objects, such as text, video, image, or other objects, as described herein. As illustrated, record 204 shows that digital content object A1 has had two displays, while objects A2, B3, C1, and C3 have had only one each.

In some embodiments, digital content elements may also comprise digital content items which may encompass more than one category of digital content object. For example, if the digital content object tracking system wishes to track displays of a digital content item that is an article, it may track displays of various textual features of the article, such as full body text, partial body text, title, abstract, publisher, publishing date, author, etc. Each object is thus associated with its digital content item, the article.

Associations between digital content objects and digital content items may be maintained by the content repository 108, such as in a list library 208. In the illustrated data structure, each row of the list library 208 may correspond to one digital content item. While items A, B, and C are shown, other embodiments may have a different number of entries. Each column of the list library 204 may correspond to a particular category of digital content objects, with a total of n categories shown. Thus, for example, A1 may be item A's digital content object for category 1.

As discussed above, examples of categories include, but are not limited to, full body text, partial body text, title, abstract, publisher, publishing date, author, etc. While these example categories generally correspond to text content, other categories may include other types of digital content, e.g., video content, image content, etc. The category definitions may be flexible and may be adapted to suit the objectives of a particular implementation.

In various embodiments, display of digital content objects may be considered to achieve display of the associated digital content item. Thus, if a digital content object representing full body text of an article is displayed, the digital content object tracking system 100 may determine that the associated digital content item was displayed. In various embodiments, however, this inference may be limited to display of only particular predetermined categories of digital content objects. For example, the display of a title, and only a title, may not be considered sufficient to count the associated digital content item as having been displayed.

An example is shown at records 205 and 204. Assume, for the sake of the instant example, that category 1 is "full body text," category 2 is "partial body text" and category 3 is "publishing date." Assume as well that digital content items A, B, and C are articles. In the example, objects of categories 1 and 2 may be considered, when displayed, to have displayed their associated digital content items. By contrast, the display of a publishing date does not display much information about an article, and thus display of a category 3 item does not count as display of the item.

Record 204 shows that A1 was displayed two times, while A2 was displayed once. However, A1 and A2 were shown at the same time. Correspondingly, the record associated with digital content item A shows a total of two displays for that item. By contrast, while digital content objects C1 and C3 are both recorded in record 204 as having been displayed once each, only one, C1, counts as a display of the associated article. Therefore C shows only one display in record 205. Similarly, item B, which shows only a display of object B3 in record 204, shows zero displays in record 205.

In various embodiments, digital content objects may be included in one or more containers, such as containers 216 and 220. Thus, for example, container 216 may include digital content elements A1, A2, and C3 and container 220 may include values A1, B3, and C1.

In various embodiments, the containers 216 and 220 may be constructed by the message constructor 112. In various embodiments, the containers 216 and 220 may include a single digital content element or set of digital content elements for tracking by the digital content object tracking system 100. In various embodiments, definitions of the containers may be stored within the content repository 108.

In various embodiments, the containers 216 and 220 may be constructed by the message constructor 112 as markup-language pages, such as HTML or XML-based pages. In some embodiments, display of the container itself may comprise an indication that the container, and thus the digital content objects inside it have been displayed. For example, an electronic message, when displayed, may request container HTML code from the digital content object tracking system 100, causing the counter 104 to increment various counting records accordingly.

In another embodiment, containers may comprise code that facilitates tracking of the objects contained therein. For example, a container comprising HTML code may comprise code which, when received in an electronic message and displayed, may send an indication of the display back to the digital content object tracking system 100. For example, the code may provide for a request for a page or an image which indicates to the digital content object tracking system 100, and specifically the counter 104, that the digital content objects contained in the container are being displayed.

In various embodiments, the message constructor 112 may transmit one or more electronic messages that may be viewed at the receiving device 116 as various presentation layers, such as, for example, presentation layers 228 and 232. In one embodiment, the receiving device may display presentation layer 228 and presentation layer 232; in other embodiments, one or more other presentation layers may be displayed on the receiving device. In various embodiments, presentation layers may be variations of the same electronic message or different electronic messages altogether.

Similar to the example electronic message 120 in FIG. 1, it may be noted that each presentation layer may have content for which tracking is not desired. This non-tracked content is illustrated by wavy lines. Thus, in the illustrated embodiment, only the containers 216 and 220 are tracked as part of display of presentation layers 228 and 232.

In the illustrated embodiment, if both presentation layers 228 and 232 are displayed, then container 216 is displayed along with presentation layer 224 and container 220 is displayed along with presentation layer 232. The resulting counting records are shown in record 204, such that digital content object A1 has two displays and A2, B3, C1, and C3 each have one.

Figure 3:
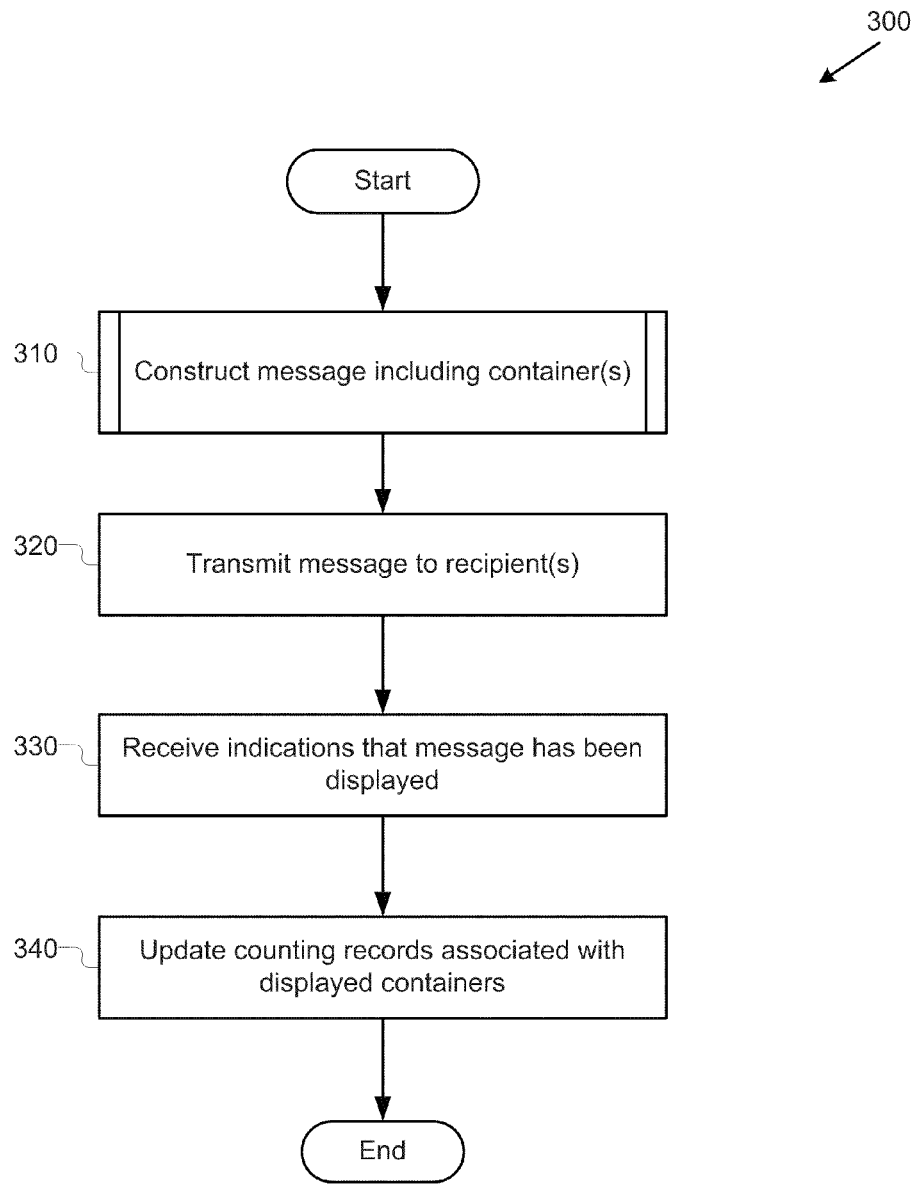
FIG. 3 illustrates a process for tracking digital content objects sent in electronic messages in accordance with various embodiments.

FIG. 3 illustrates an example process 300 for tracking digital content objects sent in electronic messages according to various embodiments. In various embodiments, the operations of process 300 may be performed in an order other than the order illustrated. Further, in various embodiments, one or operations may be performed concurrently, operations may be merged, or operations may be omitted. The process 300 may begin at operation 310, where an electronic message is constructed, such as by using the message constructor 112, containing one or more containers. As discussed above, in various embodiments, the message may contain one or more presentation layers which contain different containers. In various embodiments, the message constructor 112 may utilize container definitions maintained by the content repository 108. Various embodiments of operation 310 are discussed below with reference to FIG. 4.

At operation 320, the electronic message may be transmitted to one or more receiving devices, such as by the message constructor 112. At operation 330, the digital content tracking system 100 may receive one or more indications that the message has been displayed, such as from receiving devices. Embodiments of these notifications were described above. Next, at operation 340, the counter 104 may update the counting records associated with containers which were displayed. The process 300 may then end.

Figure 4:
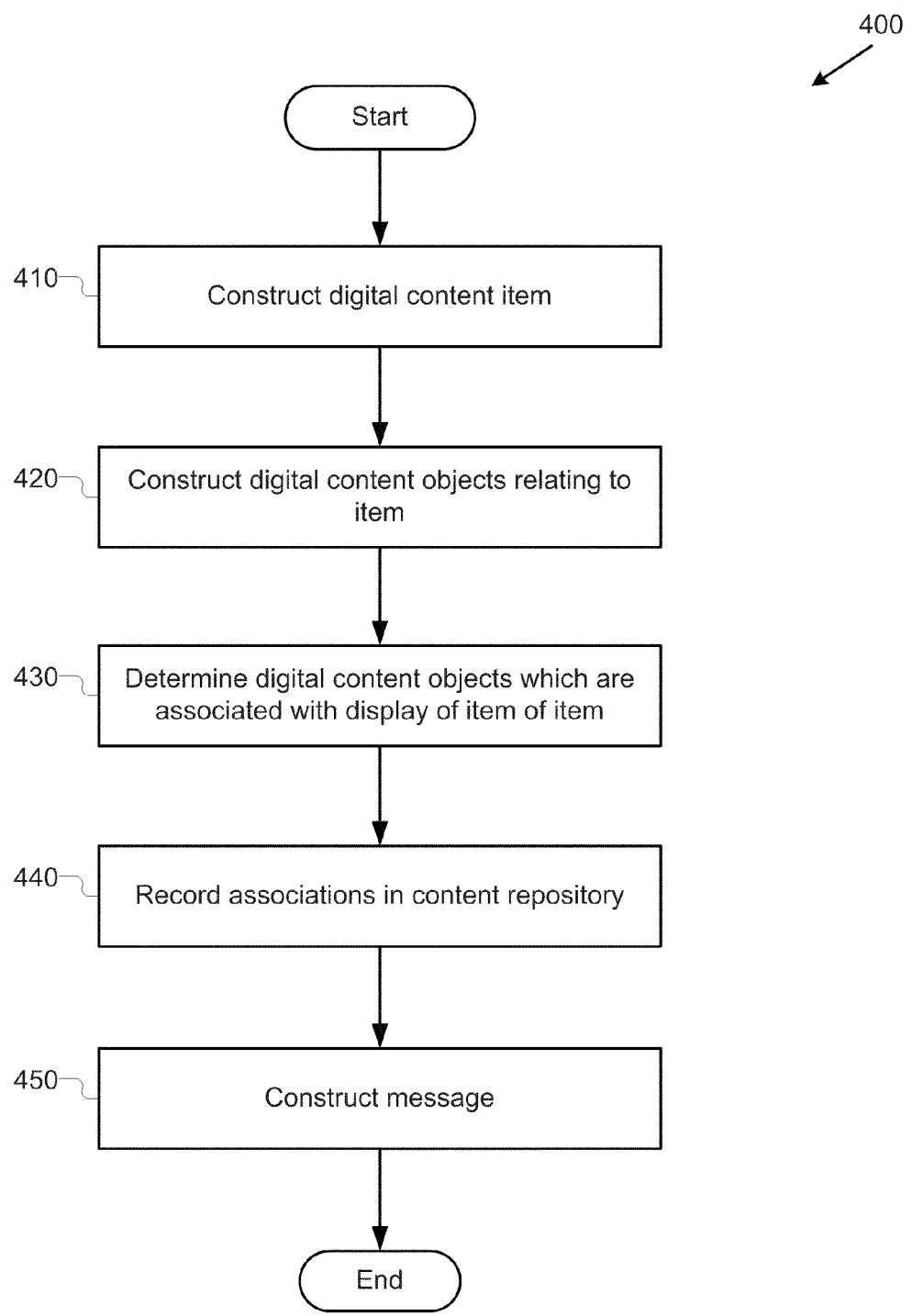
FIG. 4 illustrates a process for constructing electronic messages to use with the digital content object tracking system in accordance with various embodiments.

FIG. 4 illustrates an example process 400 for constructing electronic messages to use with a digital content object tracking system in accordance with various embodiments. In various embodiments, process 400 may correspond to operation 310 of FIG. 3. In various embodiments, the operations of process 300 may be performed in an order other than the order illustrated. Further, in various embodiments, one or operations may be performed concurrently, operations may be merged, or operations may be omitted. The process 400 may begin at operation 410, where a digital item is constructed, such as, for example, an article. At operation 420, one or more digital content objects relating to the item are constructed. For example, the system may construct the fully body text, a short abstract, an extended abstract, the title, etc., each as separate digital content objects. At operation 430 digital content objects which are associated with display of the digital content item are determined. Thus, for example, the full body text may be determined to be associated with display of the item, while the title (alone) may not be. At operation 450, the message constructor 112 may construct the message. The process 400 may then end.

In various embodiments, container-based tracking as described herein may allow for granular and/or selective tracking of a variety of objects including, but not limited to, text that is transmitted to a receiving device in a text format. By appropriately managing containers, a user may be able to determine additional information beyond simply counts of how often digital content objects have been displayed.

For example, a user may, through the tracking techniques described herein, determine which of two types of content object are more likely to gain attention from a recipient. For example, consider an embodiment in which a first presentation layer includes a short abstract of an article and a second presentation layer includes an extended abstract of the article. It may be valuable to determine which of the two abstracts, when viewed, more often results in a recipient ultimately displaying a third presentation layer, which would have the full body text of the article. Providing a first container with the short abstract, a second container with the extended abstract, and a third container with the full body text, and studying the tracking results, may result in counting records recording this comparative information.

Figure 5:
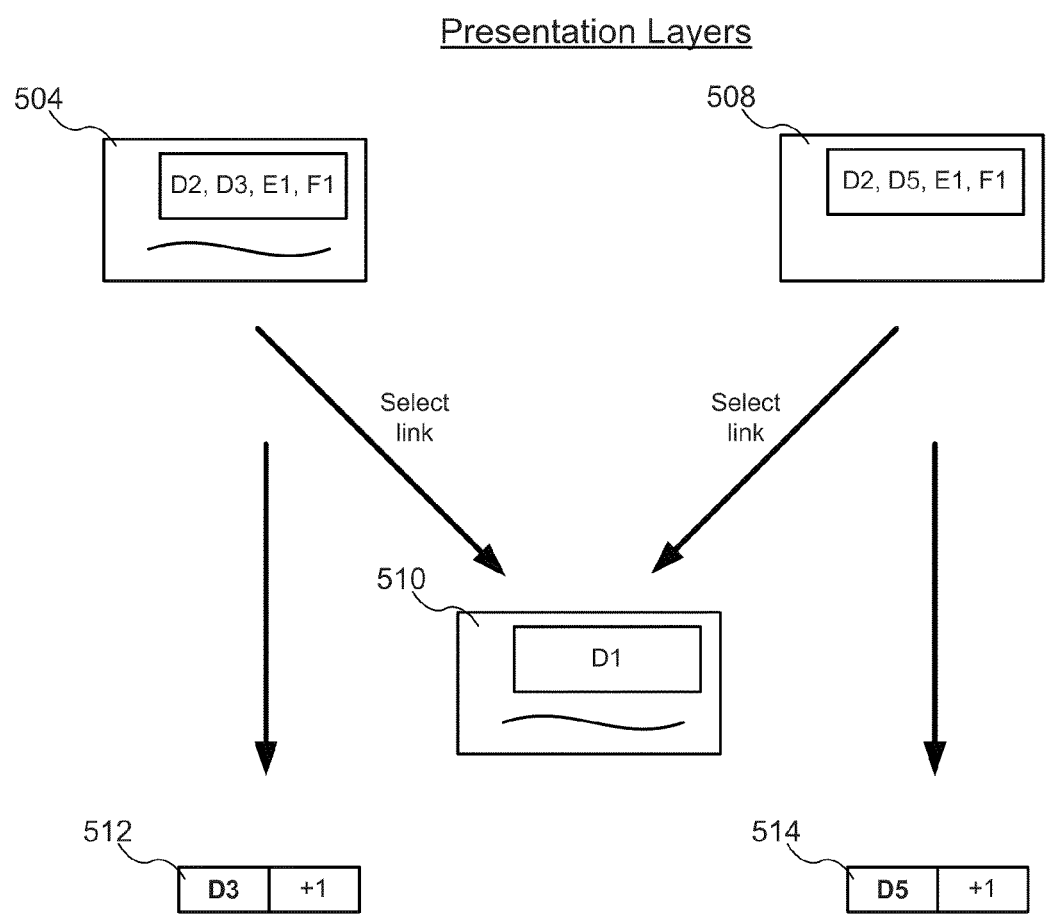
FIG. 5 illustrates an example of tracking multiple presentation layers to determine the effect of digital content object presentation on activation of an object in accordance with various embodiments.

FIG. 5 illustrates such an example. In the example, digital content item D, which is an article, is associated with various digital content objects, including: D1, an attachment; D2, a title; D3, an abstract; D4, the full article, D5, the author's name; and D6, the copyright date. In this example, digital content item E is another article associated with digital content objects E1, a title; E2, the full article; and E3, the author's name. In this example, digital content item F is another article associated with digital content objects F1, a title; F2, the full article; and F3, the author's name.

In this example, presentation layer 504 contains digital content object D3, which is a display name linked, through recipient selection, to object D1. Presentation Layer 504 also contains D2, E1 and F1. Presentation Layer 508 contains D5, which is a display name linked, through recipient selection, to D1 as well. Presentation Layer 508 also contains D2, E1 and F1. As illustrated, when either presentation layer is displayed, a related counter record for the relevant digital content object (either 512 or 514) is incremented. Using this methodology, a user can distinguish between displays of the abstract D3 which lead to the download of attachment D1 and the displays of the author's name D5 which lead to the download of attachment D1. Though both methods lead to the download of D1, a user of the digital content object tracking system 100 can distinguish between what the user viewed that lead to an intended result.

Figure 6:
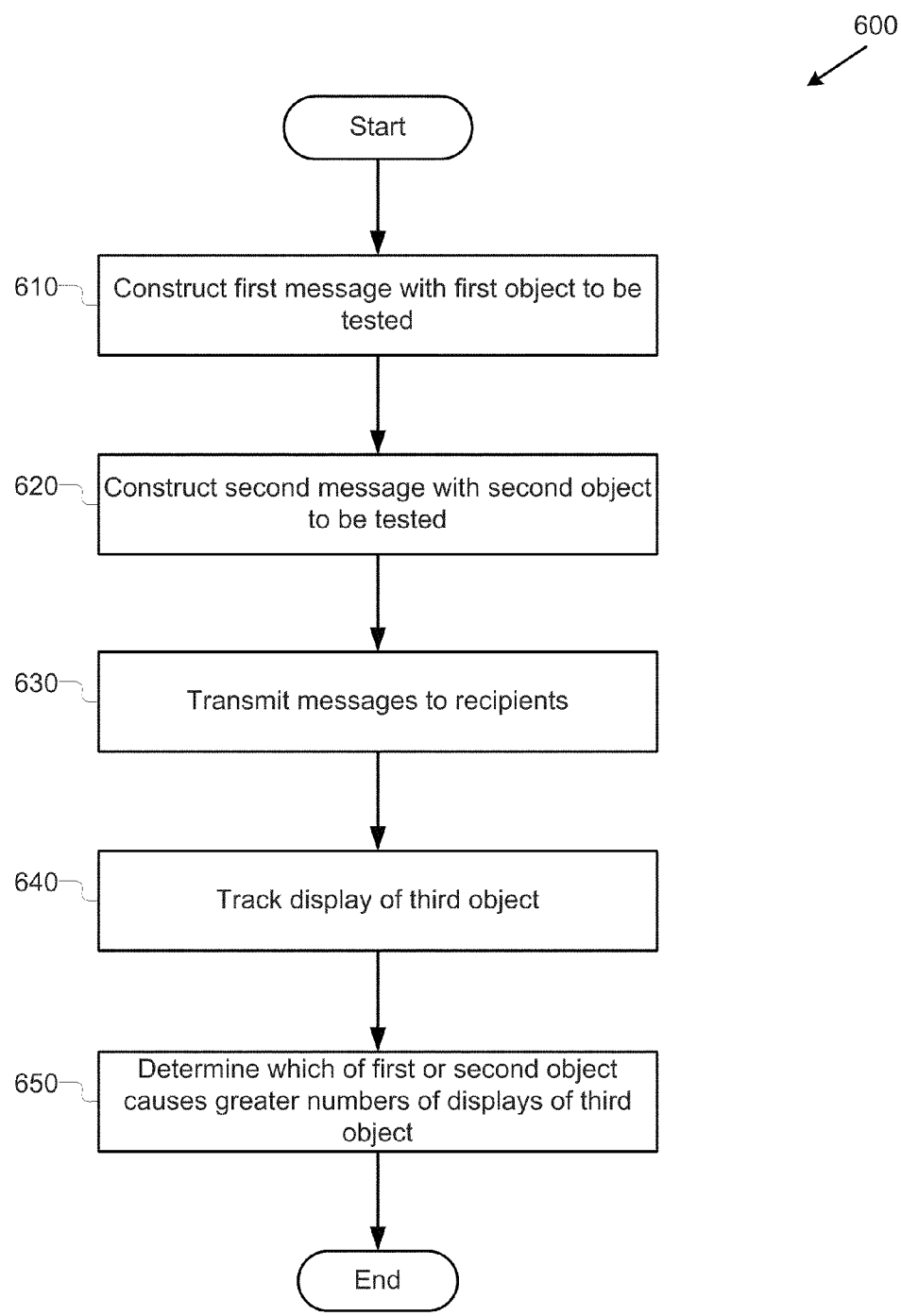
FIG. 6 illustrates a process for tracking multiple presentation layers to determine the effect of digital content object presentation on activation of an object in accordance with various embodiments.

FIG. 6 illustrates an example process 600 for constructing electronic messages to use with the digital content object tracking system 100 in accordance with various embodiments. In various embodiments, the operations of process 600 may be performed in an order other than the order illustrated. Further, in various embodiments, one or operations may be performed concurrently, operations may be merged, or operations may be omitted. The process 600 may begin at operation 610, where a first message is constructed with a digital content object to be tested, such as D3 in the example above. At operation 620, a second message is constructed with a digital content object to be tested, such as D5 in the example above. At operation 630, the messages are transmitted to recipients. Next, at operation 640, displays of the third object (D1, in the example) are tracked by the digital content object tracking system 100. Using this tracking information, at operation 650, the digital content object tracking system 100 may then determine which of the first or second objects (D3 or D5) cause a greater number of displays of the third object (D1). The process may then end.

As discussed above, in some embodiments, the counter 104 may, in addition to counting displays of digital content objects, track and count displays at a digital content item level. Examples of this were discussed above with respect to record 205 of FIG. 2. Thus, an item counting record may be incremented when a digital content object associated with the item is displayed. As discussed, in various embodiments, not every digital content object, when displayed may be considered a display of the associated digital content item.

Figure 7:
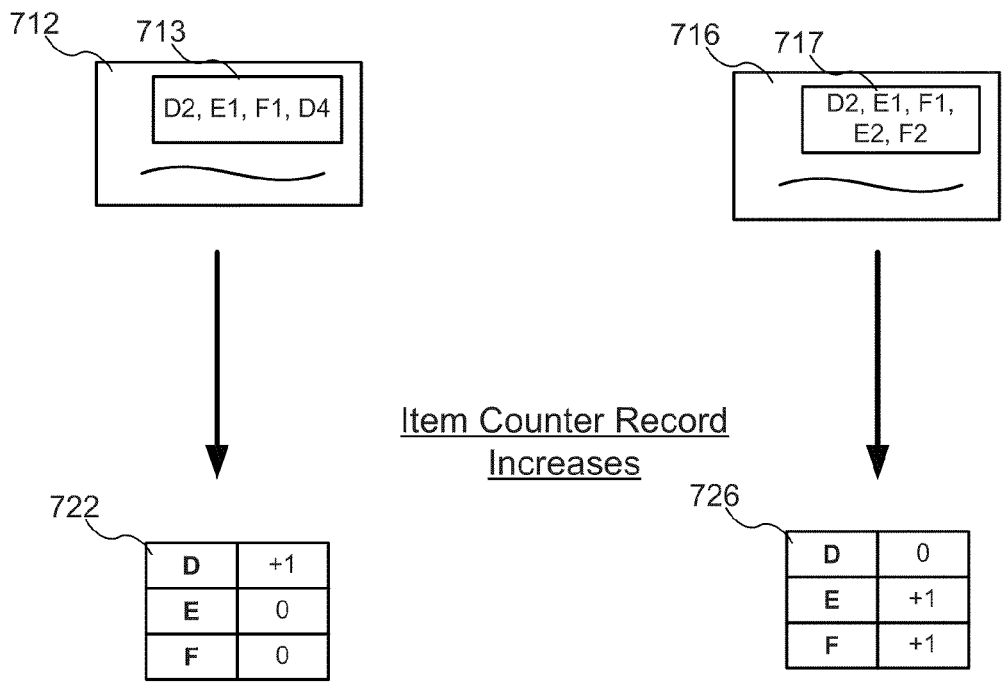
FIG. 7 illustrates an example of digital content item tracking using the digital content object tracking system in accordance with various embodiments.

While an example was discussed above, FIG. 7 illustrates another example using items D, E, and F discussed above, along with their associated digital content objects D1-D6, E1-E3, and F1-F3. In the example of FIG. 7, presentation layer 712 comprises container 713 which contains D2, E1, F1 and D4, while presentation layer 716 comprises container 717 which contains D2, E1, F1, E2 and F2. If, in the example, a user of the digital content object tracking system considers that displaying a full article constitutes a display of the article (or item) D, E or F, then the system would count D if a display of presentation layer 712 occurred because it is known that the recipient displayed container 713, and thus full article D4. This is reflected in the item counter record increases 722. Likewise, the system can count E and F as being displayed for displays of presentation layer 716 because both full articles E2 and F2 are in container 717, which is in presentation layer 716. This may be seen in item counter record increases 726.

Figure 8:
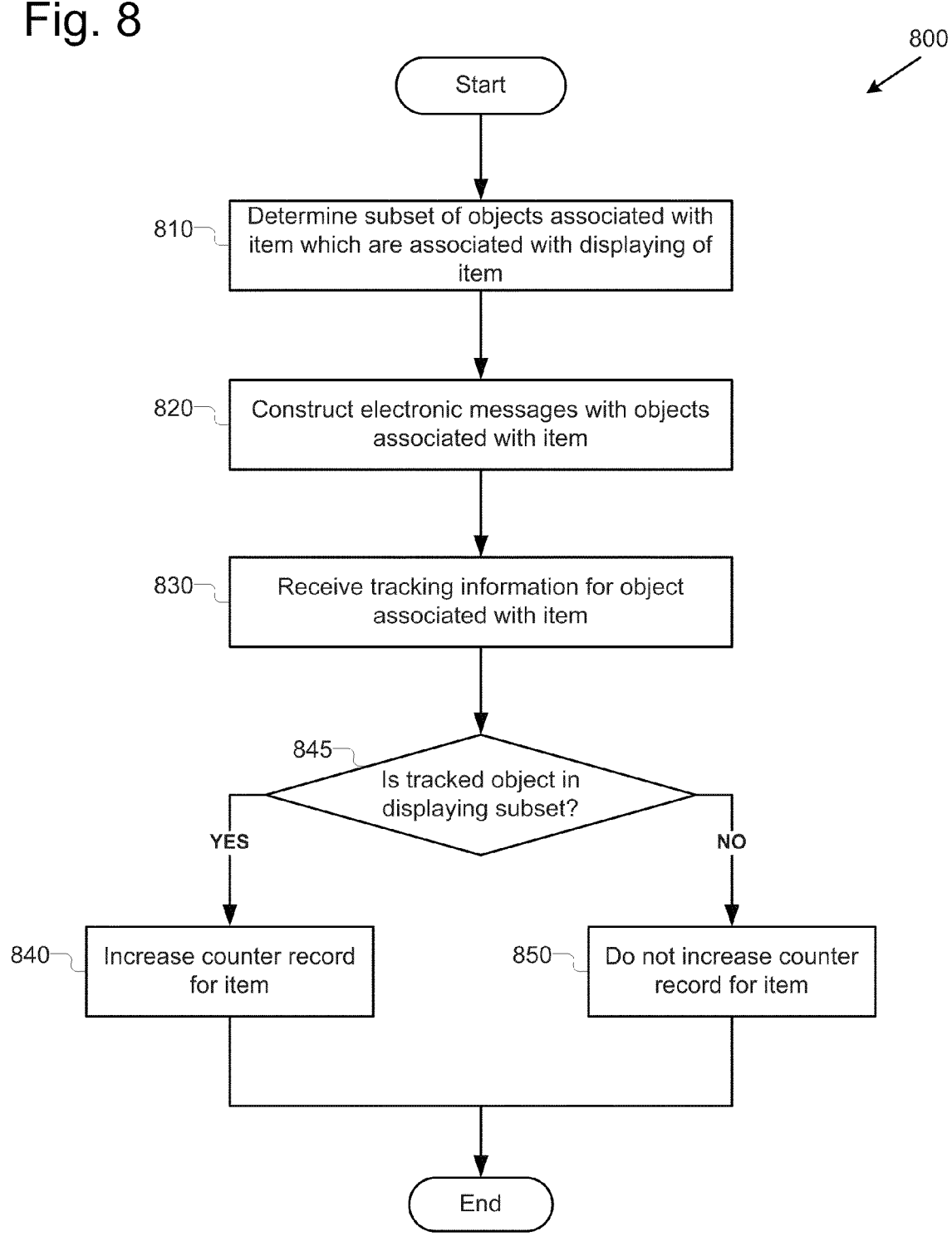
FIG. 8 illustrates a process for tracking digital content items using the digital content object tracking system in accordance with various embodiments.

FIG. 8 illustrates an example process 800 for tracking digital content items using the digital content object tracking system 100 in accordance with various embodiments. In various embodiments, the operations of process 800 may be performed in an order other than the order illustrated. Further, in various embodiments, one or operations may be performed concurrently, operations may be merged, or operations may be omitted. The process may being at operation 800, where a subset of digital content objects associated with an item are determined to be further associated with a display of the item. In the example above, full articles would be part of this subgroup, as might be extended abstracts. In various embodiments, the subset may omit one or more digital content objects associated with a digital content item, such as, in the example above, a title object or a publication date object.

At operation 820, the message constructor 112 may construct electronic messages using containers that include objects associated with the digital content item. Then, at operation 830, the digital content object tracking system 100 may receive tracking information for these objects.

Next, at decision operation 845, the counter 104 may determine if a tracked object (i.e. one for which a display notification was received) is in the display subset determined at operation 810. If so, then at operation 840, the counter record for that item is increased. If not, at operation 850, the counter item is not increased. In various embodiments, the process 800 may then repeat at decision operation 845 for a next tracked object. In various embodiments, when there are no more tracked objects, the process 800 may then end.

Figure 9:
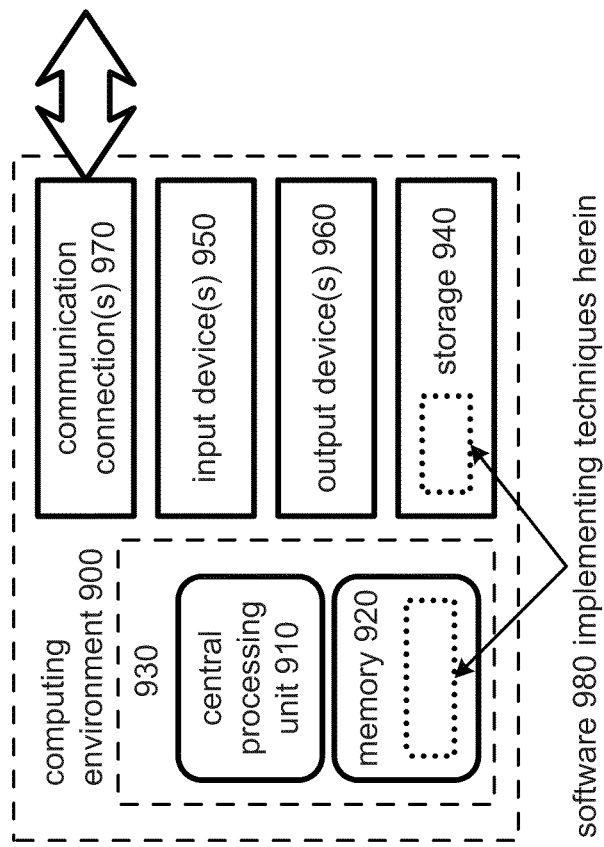
FIG. 9 illustrates an example computing environment configured to practice various aspects of the earlier described methods and systems.

FIG. 9 illustrates a generalized example of a suitable computing environment 900 in which several of the described embodiments may be implemented. The computing environment 900 is not intended to suggest any limitation as to scope of use or functionality, as the techniques and tools may be implemented in diverse general-purpose or special-purpose computing environments such as personal computers, consumer electronic devices, and the like.

With reference to FIG. 9, the computing environment 900 includes at least one CPU 910 and associated memory 920. In FIG. 9, this most basic configuration 930 is included within a dashed line. The processing unit 910 executes computer-executable instructions and may be a real or a virtual processor. In a multi-processing system, multiple processing units execute computer-executable instructions to increase processing power. The memory 920 may be volatile memory (e.g., registers, cache, RAM), non-volatile memory (e.g., ROM, EEPROM, flash memory, etc.), or some combination of the two. The memory 920 stores software 980 implementing the techniques described herein.

A computing environment may have additional features. For example, the computing environment 900 includes storage 940, one or more input devices 950, one or more output devices 960, and one or more communication connections 970. An interconnection mechanism (not shown) such as a bus, controller, or network interconnects the components of the computing environment 900. Typically, operating system software (not shown) provides an operating environment for other software executing in the computing environment 900, and coordinates activities of the components of the computing environment 900.

The storage 940 may be removable or non-removable, and includes magnetic disks, magnetic tapes or cassettes, CD-ROMs, DVDs, flash drives, disk arrays, or any other medium which can be used to store information and which can be accessed within the computing environment 900. The storage 940 stores instructions for the software.

The input device(s) 950 may be a touch input device such as a keyboard, mouse, pen, or trackball, a voice input device, a scanning device, or another device that provides input to the computing environment 900. For audio or video encoding, the input device(s) 950 may be a sound card, video card, TV tuner card, or similar device that accepts audio or video input in analog or digital form, or a CD- or DVD-based drive that reads audio or video samples into the computing environment 900. The output device(s) 960 may be a display (e.g., monitor, display screen, or the like), printer, speaker, DVD-writer, or another device that provides output from the computing environment 900.

The communication connection(s) 970 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

The techniques and tools can be described in the general context of non-transitory computer-readable media. Computer-readable media are any available media that can be accessed within a computing environment. By way of example, and not limitation, with the computing environment 900, computer-readable media include memory 920, computer-readable storage media 940 (e.g., CDs, DVDs, diskettes, flash drives, removable hard drives, hard drive arrays), and combinations of any of the above.

The techniques and tools can be described in the general context of computer-executable instructions, such as those included in program modules, being executed in a computing environment on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing environment.

Although certain embodiments have been illustrated and described herein, it will be appreciated by those of ordinary skill in the art that a wide variety of alternate and/or equivalent embodiments or implementations calculated to achieve the same purposes may be substituted for the embodiments shown and described without departing from the scope of the present invention. Those with skill in the art will readily appreciate that embodiments in accordance with the present invention may be implemented in a very wide variety of ways. This application is intended to cover any adaptations or variations of the embodiments discussed herein. Therefore, it is manifestly intended that embodiments in accordance with the present invention be limited only by the claims and the equivalents thereof.

The herein described subject matter sometimes illustrates different components or elements contained within, or connected with, different other components or elements. It is to be understood that such depicted architectures are merely examples, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated may also be viewed as being "operably connected", or "operably coupled", to each other to achieve the desired functionality, and any two components capable of being so associated may also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Various aspects of the subject matter described herein are described using terms commonly employed by those skilled in the art to convey the substance of their work to others skilled in the art. However, it should be apparent to those skilled in the art that alternate implementations may be practiced with only some of the described aspects. For purposes of explanation, specific numbers, materials, and configurations are set forth in order to provide a thorough understanding of the illustrative examples. However, it should be apparent to one skilled in the art that alternate embodiments may be practiced without the specific details. In other instances, well-known features are omitted or simplified in order not to obscure the illustrative embodiments.

With respect to the use of substantially any plural and/or singular terms herein, those having skill in the art may translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and e, etc." is used, in general such a construction is intended in the sense one having skill in the art would understand the convention (e.g., "a system having at least one of A, B, and C" would include but not be limited to systems that have A alone, B alone, C alone, A and B together, A and e together, Band e together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, Band C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

Various operations may be described as multiple discrete operations in turn, in a manner that may be helpful in understanding embodiments; however, the order of description should not be construed to imply that these operations are order dependent. Also, embodiments may have fewer operations than described. A description of multiple discrete operations should not be construed to imply that all operations are necessary. Also, embodiments may have fewer operations than described. A description of multiple discrete operations should not be construed to imply that all operations are necessary.

Although certain embodiments have been illustrated and described herein for purposes of description of the preferred embodiment, it will be appreciated by those of ordinary skill in the art that a wide variety of alternate and/or equivalent embodiments or implementations calculated to achieve the same purposes may be substituted for the embodiments shown and described without departing from the scope of the disclosure. Those with skill in the art will readily appreciate that embodiments of the disclosure may be implemented in a very wide variety of ways. This disclosure is intended to cover any adaptations or variations of the embodiments discussed herein. Therefore, it is manifestly intended that embodiments of the disclosure be limited only by the claims and the equivalents thereof.

Embodiments described herein provide for the ability to track digital content objects displayed by a receiving device; the ability to track a digital content item based on a display by a receiving device of a specific digital content object associated with that digital content item; the ability to selectively track digital content objects; the ability to track a multiple-format digital content item (e.g., text and attachment or document and metadata); the ability to distinguish between displays of digital text content and displays of attachment of multiple-format content items; and the ability to distinguish between displays of digital text content and displays of an attachment of a single multiple-format item.

Other embodiments have also be disclosed and described.

What is claimed is:

1. A method for tracking displays of digital content objects, the method comprising:
    receiving, by a computer-implemented tracking system, one or more indications that one or more containers comprising one or more digital content objects associated with a digital content item have been displayed as parts of one or more electronic messages, wherein the digital content objects are associated with respective categories, the digital content objects being associated with the respective categories prior to display of the one or more electronic messages; and
    selectively updating, by the computer-implemented tracking system, a counting record associated with the digital content item to reflect the one or more containers having been displayed, the updating based at least in part on whether the one or more digital content objects were associated prior to display with categories that indicate that the digital content item has been displayed.

2. The method of claim 1, further comprising:
    constructing, by the computer-implemented tracking system, the one or more electronic messages; and
    transmitting, by the computer-implemented tracking system, the one or more constructed electronic messages to a receiving device.

3. The method of claim 2, wherein constructing the one or more electronic messages comprises constructing one or more presentation layers for a set of digital content.

4. The method of claim 1, wherein a first electronic message and a second electronic message of the one or more electronic messages include respective digital containers comprising different respective categories of digital content objects.

5. The method of claim 4, further comprising determining, by the computer-implemented tracking system, whether displays of selected digital content objects are associated with greater or fewer displays of other digital content objects.

6. The method of claim 1, wherein constructing the one or more electronic messages comprises:
    constructing, by the computer-implemented tracking system, a first electronic message comprising a first digital container, the first digital container comprising a first digital content object;
    constructing, by the computer-implemented tracking system, a second electronic message comprising a second digital container, the second digital container comprising a second digital content object, wherein both the first and the second digital content objects may be activated to cause a third digital content object to be displayed; and
    transmitting, by the computer-implemented tracking system, the first and second electronic messages; and
    wherein receiving one or more indications that one or more containers comprising one or more digital content objects have been displayed comprises receiving, by the computer-implemented tracking system, indications that the first and second electronic messages have been displayed.

7. The method of claim 6, further comprising determining, by the computer-implemented tracking system, whether display of the third digital content object is associated more often with display of the first digital content object or the second digital content object.

8. The method of claim 1, wherein the one or more digital content objects comprise one or more of text data, image data, video data, or audio data.

9. The method of claim 1, wherein the digital container comprises a markup language page.

10. The method of claim 9, wherein receiving one or more indications that one or more containers comprising one or more digital content objects have been displayed as parts of an electronic message comprises receiving, by the computer-implemented tracking system, an indication that the markup language page has been displayed to a recipient of the one or more electronic messages.

11. The method of claim 1, wherein:
    a first set of at least a first digital content object associated with the digital content item is associated with a first category indicating that the digital content item has been displayed; and
    updating the counting record associated with the digital content item comprises updating, by the computer-implemented tracking system, the counting record for the digital content item based on a receipt of an indication that one of the digital content objects in the first category has been displayed.

12. The method of claim 11, wherein:
    the first set of at least at least a second digital content object is associated with a second category that does not indicate that the digital content item has been displayed; and
    the computer-implemented tracking system does not update a counting record for the digital content item based on a receipt of an indication that one of the digital content objects associated with the second category, but which is not associated with the first category, has been displayed.

13. A system for tracking displays of digital content objects, the system comprising:
    one or more computer processors;
    a content repository configured, in response to operation by the one or more computer processors, to maintain information describing one or more digital containers comprising one or more digital content objects; and a counter configured, in response to operation by the one or more computer processors, to:
receive an indication that one or more digital containers comprising one or more digital content objects associated with a digital content item have been displayed to a recipient of an electronic message, wherein the one or more digital content objects are associated with respective categories, the digital content objects being associated with the respective categories prior to display of the one or more electronic messages; and
increase a counting record associated with the digital content item which are associated with the displayed digital container based, at least in part, on whether the one or more digital content objects were associated prior to display with categories that indicate that the digital content item has been displayed.

14. The system of claim 13, further comprising a message constructor configured, in response to operation by the one or more computer processors, to:
construct electronic messages comprising digital containers; and
transmit the constructed electronic messages to one or more receiving devices.

15. The system of claim 14, wherein the counter is further configured, in response to operation by the one or more computer processors, to determine whether displays of selected digital content objects are associated with greater or fewer displays of other digital content objects.

16. The system of claim 15, wherein the message constructor is further configured, in response to operation by the one or more computer processors, to:
construct a first electronic message comprising a first digital container, the first digital container comprising a first digital content object; and
construct a second electronic message comprising a second digital container, the second digital container comprising a second digital content object, wherein both the first and the second digital content objects may be activated to cause a third digital content object to be displayed; and
wherein the counter is further configured, in response to operation by the one or more computer processors, to determine whether display of the third digital content object is associated more often with display of the first digital content object or the second digital content object.

17. The system of claim 13, wherein the content repository is configured to maintain, in response to operation by the one or more computer processors, for respective digital containers, respective counting records which indicate one or more tracked digital content objects contained in the respective digital containers.

18. The system of claim 17, wherein the respective digital content objects comprise one or more of text data, image data, video data, or audio data.

19. The system of claim 13, wherein:
the content repository is further configured to maintain information describing the digital content item; and
at least one digital content object associated with the digital content item is associated with a first category indicating that the digital content item has been displayed.

20. The system of claim 19, wherein the counter is further configured, in response to operation by the one or more computer processors, to not increase the counting record for the digital content item based on a receipt of an indication that an other displayed digital content object associated with the digital content item is associated with a second category that does not indicate that the digital content item has been displayed.

21. An article of manufacture, comprising:
a tangible, non-transitory computer-readable medium; and
a plurality of computer-executable instructions stored on the tangible computer-readable medium, wherein the computer-executable instructions, if executed by the apparatus, cause the apparatus to perform operations for tracking display of digital content objects, the operations comprising:
constructing a first electronic message comprising a first digital container comprising one or more digital content objects;
transmitting the first electronic message;
receiving an indication that the one or more digital content objects associated with a digital content item from the first digital container have been displayed, wherein the digital content objects are associated with respective categories, the digital content objects being associated with the respective categories prior to display of the one or more electronic messages; and
selectively updating a counting record associated with the digital content item to reflect the one or more containers having been displayed, the updating based at least in part on whether the one or more digital content objects were associated prior to display with categories that indicate that the digital content item has been displayed.

22. The article of claim 21, wherein:
the first digital container comprises a first digital content object; and
the operations further comprise:
constructing a second electronic message comprising a second digital container comprising a second digital content object, wherein both the first and the second digital content objects may be activated to cause a third digital content object to be displayed;
transmitting the second electronic message;
receiving indications that the first and second messages have been displayed; and
determining whether display of the third digital content object is associated more often with display of the first digital content object or the second digital content object.

23. The article of claim 21, wherein the digital content objects comprise one or more of text data, image data, video data, or audio data.

24. The article of claim 21, wherein:
a first set of at least a first digital content object associated with the digital content item is associated with a first category indicating that the digital content item has been displayed; and
the operations for updating the counting record associated with the digital content item comprise operations for updating the counting record for the digital content item based on a receipt of an indication that one of the digital content objects in the first category has been displayed.

25. The article of claim 24 wherein:
at least a second digital content object is associated with a second category that does not indicate that the digital content item has been displayed; and
operations for updating the counting record associated with the digital content item comprise operations for the computer-implemented tracking system not updating the counting record for the digital content item based on a receipt of an indication that one of the digital content objects associated with the second category, but which is not associated with the first category, has been displayed.

* * * * *